(12) United States Patent
Schicker et al.

(10) Patent No.: US 10,926,782 B2
(45) Date of Patent: Feb. 23, 2021

(54) STRAIN GAUGE ASSEMBLY, PARTICULARLY FOR AN AXLE COUNTER

(71) Applicant: Thales Management & Services Deutschland GmbH, Ditzingen (DE)

(72) Inventors: Kai Schicker, Mehltheuer (DE); Kassen Oldewurtel, Markgröningen (DE); Rainer Klemm, Steinheim (DE); Florian Muschaweckh, Unterföhring (DE); Lars Hoffmann, Munich (DE)

(73) Assignee: THALES MANAGEMENT & SERVICES DEUTSCHLAND GMBH, Ditzingen (DE)

( * ) Notice: Subject to any disclaimer, the term of this patent is extended or adjusted under 35 U.S.C. 154(b) by 0 days.

(21) Appl. No.: 16/826,220

(22) Filed: Mar. 21, 2020

(65) Prior Publication Data

US 2020/0216103 A1  Jul. 9, 2020

Related U.S. Application Data

(63) Continuation of application No. PCT/EP2018/073820, filed on Sep. 5, 2018.

(30) Foreign Application Priority Data

Sep. 22, 2017  (EP) .................... 17192644

(51) Int. Cl.
  *B61L 1/16*  (2006.01)
  *B61L 23/04*  (2006.01)
  *G01D 5/353*  (2006.01)

(52) U.S. Cl.
  CPC ............ *B61L 1/166* (2013.01); *B61L 23/042* (2013.01); *G01D 5/35316* (2013.01)

(58) Field of Classification Search
  None
  See application file for complete search history.

(56) References Cited

U.S. PATENT DOCUMENTS

2008/0019701 A1*  1/2008  Tam .................... B61L 23/041
                                                  398/141
2010/0021106 A1   1/2010  Tam et al.
(Continued)

FOREIGN PATENT DOCUMENTS

CN    102079319 A    6/2011
CN    102089618 A    6/2011
(Continued)

*Primary Examiner* — Dominic J Bologna
(74) *Attorney, Agent, or Firm* — Hackler Daghighian Martino & Novak

(57) ABSTRACT

A strain gauge arrangement for an axle counter has a strain sensor element, a carrier and a railway line structure that is to be monitored. At least one part of the carrier is maintained in an elastically deformed state by the structure when the carrier is secured to the structure. The carrier is formed from a first carrier piece and a second carrier piece, which lie opposite one another at a distance from one another. The strain sensor element has one first fixing point fixed to the first carrier piece, and one second fixing point fixed to the second carrier piece, and a middle section mounted between the fixing points which are not fixed to the first or second carrier piece. The strain gauge arrangement is simple to handle and a drop can be reliably detected and a strain state of the strain sensor element can be predetermined more easily.

7 Claims, 11 Drawing Sheets

(56) References Cited

U.S. PATENT DOCUMENTS

| | | |
|---|---|---|
| 2011/0188537 A1 | 8/2011 | Tam et al. |
| 2015/0000415 A1* | 1/2015 | Kelley ................ B61L 15/0054 |
| | | 73/649 |
| 2015/0013465 A1* | 1/2015 | Godfrey ................ B61L 23/047 |
| | | 73/655 |
| 2016/0356661 A1* | 12/2016 | Glueck ................ B61L 23/042 |
| 2018/0022367 A1 | 1/2018 | Oldewurtel et al. |
| 2018/0259371 A1 | 9/2018 | Muller et al. |
| 2018/0274909 A1* | 9/2018 | Muller ................ G02B 6/0218 |

FOREIGN PATENT DOCUMENTS

| | | |
|---|---|---|
| CN | 106 501 165 A | 3/2017 |
| DE | 10 2005 010 344 A1 | 9/2006 |
| DE | 10 2014 100 653 A1 | 7/2015 |
| DE | 10 2015 115 925 B3 | 12/2016 |
| EP | 1 128 171 A1 | 8/2001 |
| EP | 3 069 952 A1 | 9/2016 |
| JP | 2001 021 384 A | 1/2001 |
| JP | 2003 287 435 A | 10/2003 |
| JP | 2006 201 071 A | 8/2006 |
| WO | 01/35133 A1 | 5/2001 |
| WO | 2017050766 A1 | 3/2017 |

\* cited by examiner

STRAIN GAUGE ASSEMBLY, PARTICULARLY FOR AN AXLE COUNTER

CROSS-REFERENCE TO RELATED APPLICATIONS

This continuation application claims priority to PCT/EP2018/073820 filed on Sep. 5, 2018 which has published as WO 2019/057491 A1 and also the European application Ser. No. 17192644.7 filed on Sep. 22, 2017, the entire contents of which are fully incorporated herein with these references.

DESCRIPTION

Field of the Invention

The invention relates to a strain gauge arrangement. In particular, the invention relates to an axle counter comprising at least one strain sensor element, in particular an optical fiber with a fiber Bragg grating, a carrier, to which the strain sensor element is fastened, and a structure to be monitored, in particular a railroad track, to which the carrier has been fastened, wherein at least a part of the carrier is kept in an elastically deformed state by the structure when the carrier is fastened to the structure.

Background of the Invention

Such a strain gauge arrangement for an axle counter has been disclosed by EP 3 069 952 A1, in particular.

Axle counters are used to make rail traffic safer. Axle counters can be used to check, in particular, whether the location of the axle counter has been completely passed by a train, for example to determine whether associated track sections have become completely free.

A possible measuring principle of axle counters is based on using a strain sensor element to measure an elastic deformation at a rail caused by the weight of a train transferred by an axle.

In this respect, EP 3 069 952 A1 proposes to fasten a fiber Bragg grating (FBG), as a strain sensor element, to a rail under pretension. The reflection wavelength of the fiber Bragg grating depends on the elastic strain state of the FBG, on the basis of which the strain state can be measured. As a result of the pretension, the strain state of the FBG can be used to identify whether the FBG is still correctly fastened to the rail or has fallen off the rail. One variant proposes thermal application of the pretension by virtue of fastening a carrier to the rail under pretension.

Moreover, DE 10 2005 010 344 A1 has disclosed the practice of influencing damping properties in an optical waveguide via bending states.

Furthermore, strain sensor elements which are based on a change in resistance or capacitance due to a changing strain state, for example, have also been disclosed.

However, it is comparatively difficult to fasten strain sensor elements under pretension directly on a structure to be monitored, for instance a railroad track. A certain simplification can be achieved by applying the pretension via a carrier to which the strain sensor is affixed. However, it is also difficult in this case to set a defined strain state on the strain sensor element (for instance, to set a working point).

SUMMARY OF THE INVENTION

Object of the Invention

The invention is based on the object of presenting an easy-to-use strain gauge arrangement in which a fall-off can be reliably recognized and a strain state of the strain sensor element can be specified more easily.

BRIEF DESCRIPTION OF THE INVENTION

This object is achieved by a strain gauge arrangement of the type set forth at the outset, which is characterized in that the carrier is embodied with a first carrier piece and a second carrier piece, which oppose one another in spaced apart fashion, and in that the strain sensor element is fastened to the first carrier piece with at least one first fixing point, to the second carrier piece with at least one second fixing point, and to neither the first nor the second carrier piece with a central section between the fixing points.

Within the scope of the invention, provision is made for the strain sensor element not to be fastened to the carrier in linear fashion over its entire measuring length, but rather only to be fastened to a first carrier piece with a first fixing point and to a second carrier piece with a second fixing point. The strain sensor element is kept free in the central section situated therebetween.

As a result, it is possible, as a matter of principle, to at least partially decouple the strain state of the strain sensor element from the elastic deformation state of the carrier. In particular, it becomes possible to transfer an elastic deformation of the carrier resulting from a deformation of the monitored structure in a weakened or reinforced fashion, depending on the application, or to transfer said elastic deformation to the strain sensor element only above certain thresholds, or to transfer certain types of deformation of the carrier to the strain sensor element in reinforced fashion. As a result, the strain sensor element can be operated in an optimal working range, and certain monitoring functions of the strain sensor element, for instance the detection of a fall-off from the structure, can be made more reliable. At the same time, the carrier can be fastened to the structure with an easily controllable elastic deformation of the carrier, without being excessively restricted by the strain sensor element.

A simple and direct access to the strain sensor element is possible at the central section, in particular without being fixed in the deformation of the strain sensor element by preforming an underlying carrier. In the central section there can be, e.g., additional tightening (for instance by means of a driver element) or an additional relief (for instance by excess length) of the strain sensor element with respect to the carrier.

Fastening the carrier to the structure to be monitored, with at least a part of the carrier being kept in an elastically deformed state by the structure, enables a simple check to be made as to whether the strain gauge arrangement is still correctly seated on the structure or has fallen off the structure; the latter leads to springing back into an elastically non-deformed state of the carrier or at least of said part. By way of example, falling-off from the structure may occur with aging or temperature-related softening of a fastening. The strain gauge arrangement is preferably embodied in such a way that the elastic deformation or bracing of the carrier is ascertainable via a measured strain of the strain sensor element (i.e., the elastic deformation of the carrier lies in the monitored region of the strain sensor element). Alternatively, it is also possible to provide a measuring device or measurement which is separate from the strain sensor element or the strain thereof and by means of which the deformation of the carrier can be checked (for instance using a further strain sensor element).

A strain gauge arrangement usually comprises only one strain sensor element; alternatively, it may comprise also two or even more strain sensor elements.

Within the scope of the invention, a strain sensor element is fastened to a first and second carrier piece with a first and second fixing point and not fastened to these carrier pieces (or to other parts of the carrier either) in a central section. In addition to the first and second carrier piece, the carrier usually also comprises one or more further pieces (for example a base element or a bracket).

The strain sensor element is preferably embodied as an optical fiber with a fiber Bragg grating (FBG); the FBG is located between the fixing points in the central section in this case. Typically, the strain sensor element is under a slight elastic strain when the carrier is fastened to the structure, and so both compression and extension of the structure to be monitored can easily be identified.

A strain gauge arrangement according to the invention can be used in an axle counter, in particular; such an axle counter comprises at least one strain gauge arrangement according to the invention. However, other applications for the strain gauge arrangement can also be envisaged, for instance for monitoring mechanical loads or wear on machine components. A strain sensor element can be disposed at an oblique angle, for instance at an angle of approximately 45°, with respect to a neutral fiber of a structure to be monitored. By way of example, the carrier can be attached to the structure to be monitored by screwing, soldering or adhesive bonding. By way of example, the strain sensor element can be fastened to the carrier pieces by jamming, soldering or adhesive bonding.

In summary, the invention particularly easily allows, firstly, the strain sensor element (when the carrier is fastened to the structure) to be kept at a desired pretension, and, secondly, the monitoring by means of at least the part of the carrier as to whether the carrier is still (sufficiently) fastened to the structure to be monitored.

PREFERRED EMBODIMENTS OF THE INVENTION

In a preferred embodiment of the strain gauge arrangement according to the invention, provision is made for the part of the carrier which is kept in an elastically deformed state by the structure when the carrier is fastened to the structure to comprise a leaf spring element, and for the following to be formed on the leaf spring element: a support element for support on the structure when the carrier is fastened to the structure and a driver element for reaching behind the strain sensor element in the central section. An elastic deformation is impressed on the leaf spring element by the support element abutting against the structure. The driver element typically moves substantially perpendicular to the direction of extension (measurement direction) of the strain sensor element and typically moves substantially perpendicular to the surface of the structure to which the carrier has been fastened. The driver element can be used to impress an elastic strain or a bend on the strain sensor element, depending on the deformation of the leaf spring element. This strain or bend can be measured by the strain sensor element (for instance via the strain as such, or via a modified, usually increased damping), and the detachment of the carrier from the structure can thus be easily identified. This design particularly reliably detects a detachment of the strain sensor element from the structure to be monitored. All that is needed to detect the sensor falling off is an elastic deformation of the leaf spring element; in particular, there is no need to fasten (for example, adhesively bond) carrier surfaces that are elastically braced against one another to the structure, which makes installation particularly easy.

In a preferred development of this embodiment, the leaf spring element and the driver element are embodied in such a way that no strain, or only little strain, is applied to the strain sensor element by said leaf spring and driver elements in the elastically deformed state of the leaf spring element when the carrier is fastened to the structure, and a greater strain is applied to the strain sensor element in an elastically relaxed state of the leaf spring element after the carrier has been detached from the structure. In its elastically relaxed state, the leaf spring element (together with the driver element) tightens and/or bends the strain sensor element, which is usually easy to detect; conversely, the leaf spring element and the driver element (and the support element) are embodied in such a way that, in the elastically tensioned state, the strain sensor element is not or only slightly tightened by the driver element. Alternatively, it is also possible to relax the strain sensor element in the elastically relaxed state of the leaf spring element.

An embodiment in which the part of the carrier which is kept in an elastically deformed state by the structure when the carrier is fastened to the structure comprises the first carrier piece and the second carrier piece, wherein the first carrier piece and the second carrier piece are elastically braced with respect to one another with at least a direction component along an extension direction of the strain sensor element, is also advantageous. This design is particularly simple. The directional component of the elastic deformation of the carrier acts directly on the strain state of the strain sensor element.

A development of this embodiment in which the first and second carrier piece are connected to one another by a bracket is preferred, in particular wherein the bracket is spaced apart from the strain sensor element by a distance AS, preferably where the following applies to the distance AS and a distance AE from the first to the second fixing point: AS≥1*AE, particularly preferably AS≥3*AE. The bracket (sometimes called a bar) acts as a fixed joint; around this, the carrier pieces can be twisted elastically against one another. The force on the strain sensor element can be set by means of suitable distances (and a suitable elastic deflection); with AS≥3*AE, this is possible in particularly accurate fashion. If desired, one or more springs can be disposed between the carrier pieces in order to modify the elastic behavior of the carrier. As an alternative or in addition thereto, provision can be made of a connection of the carrier pieces via a base element.

A development in which the carrier forms a bracing bearing, at or in which a bracing element, which engages on the first and second carrier piece, is arrangeable, is preferred, in particular where the bracing bearing and bracing element interact in the style of a cam. With the bracing bearing and the bracing element, an elastic deformation can be temporarily impressed on the carrier or at least the part thereof, in particular while the carrier is being fastened (for instance adhesively bonded) to the structure. The application of force is particularly simple, in particular also in manual fashion, using a cam.

Advantageously, a bracing element arranged at or in the bracing bearing has been broken off from the carrier, in particular from the inner region of the bracing bearing. The bracing element can initially be manufactured as part of the carrier, and is then directly available during installation together with the carrier. For use in the bracing bearing, the bracing element (e.g. a cam) can be broken off from the carrier (for instance broken out of the bracing bearing), and used for bracing in the bracing bearing (if necessary) and activated, in particular rotated. Alternatively, the bracing element can also lose a previously existing tensioning effect by breaking off.

It is also advantageous if no bracing element is arranged at or in the bracing bearing any more. During normal operation (i.e., when measuring the strain on the structure), the tensioning element then no longer exerts a force on the carrier, and so the elastic state thereupon only depends on the fastening to the structure, as a result of which the strain gauge arrangement falling off can easily be identified.

An embodiment which provides for the carrier to have a base element, by means of which the carrier is fastened to the structure to be monitored, and for the first carrier piece and the second carrier piece to be fastened on or at the base element is preferred. Targeted and simplified fastening to the structure, in particular also over a large area, can be provided by the base element. As a rule, the carrier pieces are only fastened to the structure via the base element. A typical base structure is embodied as a closed ring ("frame") and the carrier pieces protrude inwards into the ring; the elastic deformation can then be impressed, in particular, on ring sections that extend along the direction of extension of the strain sensor element. Another typical base structure is embodied with a closed surface, on which the carrier pieces are seated.

A preferred development of this embodiment provides for the first and second carrier pieces to each be fastened to the base element only in a rear region which faces away from the strain sensor element, and for the first and second carrier pieces to each be fastened to the strain sensor element in a front region which faces away from the rear region. The carrier pieces are only attached to the structure via the base element, fastening being affected at the rear region of the respective carrier piece. The carrier pieces typically exhibit no noticeable elastic deformation (between the front and rear region). As a result of the distance from the front region to the rear region, the elastic strain of the base body or the structure is transferred in reinforced fashion to the strain sensor element. Typically, the total length GL of the carrier pieces between the front and rear regions is at least three times as long as the length AE of the strain sensor element between the fixing points.

A development in which the part of the carrier which is kept in an elastically deformed state by the structure when the carrier is fastened to the structure comprises the base element, in particular wherein the base element is substantially flat in the elastically deformed state, is preferred. The base element can be embodied in a simple manner with a suitable, elastically relaxed first shape and a desired elastically deformed second shape; the carrier pieces and the strain sensor element can then be disposed substantially freely on the base element, in particular also with a desired pretension being impressed on the strain sensor element in the elastically deformed state of the base body. The elastic bracing of the base element can (possibly also only partially) be used to achieve a bracing (pretension) on the strain sensor element, for instance for setting up the working point. Typically, the base element is fastened (for example, glued) to the structure to be monitored in planar fashion, which is implemented in particularly simple fashion when flat, for example on the side of a railroad track (rail web). Accordingly, in an elastically relaxed state, following the detachment of the carrier from the structure, the base element is typically arched, in particular in a plane that contains the direction of extension of the strain sensor element. The arching allows the elastic strain of the strain sensor element to be changed in comparison with the flat state.

An embodiment that provides for the carrier to comprise at least one application element is particularly preferred, wherein the application element, in the elastically deformed state of at least the part of the carrier, leaves the strain sensor element or a feed line of the strain sensor element unaffected, and the application element is embodied in such a way that the application element, in an elastically relaxed state of at least the part of the carrier following the detachment of the carrier from the structure, impairs, in particular kinks and/or divides, the strain sensor element or a feed line of the strain sensor element in such a way that the strain sensor element leaves its working range or completely fails. In the elastically deformed state (target state of the strain sensor element), the application element is typically spaced apart from the strain sensor element (or its feed line, for example a section of an optical fiber), and, in the elastically relaxed state (following the strain sensor falling off), the application element comes into contact with the strain sensor element (or its feed line). The strain sensor element (or its supply line) is typically kinked, squeezed or even divided (for instance cut) by the application element; this can be easily detected by a measurement, as a result of which the strain gauge arrangement falling off can be identified. In this embodiment, the strain sensor element does not have to adopt any strain components from the elastic deformation of at least the part of the carrier, which facilitates more precise measurements of the strain of the structure to be monitored. It should be noted that the change in reflection wavelength is typically considered when the strain sensor element or FBG is influenced, and damping of the reflected light increases, i.e., the damping is relevant, in the case of an influence outside the strain sensor element or FBG (effect on feed line).

An embodiment which provides for the strain sensor element to comprise an optical fiber with a fiber Bragg grating, furthermore, a further strain sensor element to be present, wherein the further strain sensor element likewise comprises this optical fiber and a further fiber Bragg grating, the further strain sensor element to be also fastened to the carrier, and for, in the elastically deformed state of at least the part of the carrier with the carrier fastened to the structure, the fiber Bragg grating to assume a first strain state in which it is transparent in a working range of the further fiber Bragg grating of the further strain sensor element and for, in an elastically relaxed state of at least the part of the carrier following the detachment of the carrier from the structure, the fiber Bragg grating to assume a second strain state in which the working range of the further fiber Bragg grating of the further strain sensor element is non-transparent, or for there to be no overlap of a reflection wavelength interval of the fiber Bragg grating and a further reflection wavelength interval of the further fiber Bragg grating between the elastically deformed state of at least the part of the carrier with the carrier attached to the structure and an elastically relaxed state of at least the part of the carrier following the detachment of the carrier from the structure is also advantageous. The strain sensor element and the further strain sensor element can be set up in such a way that the strain sensor element is used solely for the detection of a fall-off and the further strain sensor element is used for the actual detection of the strain of the structure to be monitored. As a result, the construction, assembly and/or adjustment of the strain gauge arrangement can be simplified and the strain measurement of the structure can be more precise. The further strain sensor element need not adopt any strain components from the elastic deformation of at least the part of the carrier. The first design (with a "non-transparent" fiber Bragg grating in the relaxed state) is comparatively easy to set up, for instance via a strong bend in the fiber Bragg grating or the optical fiber. However, as a rule, the second design (with "separated" reflection wavelength and further reflection wavelength) allows even more precise strain measurements. It should be noted that an elastic pretension of the carrier or of at least a part of the carrier against the structure is only needed in the monitored area of the strain sensor element (and is preferably only set up in the monitored area of the strain sensor element), but not needed in the monitored area of the further strain sensor element. The further strain sensor element can also be fastened by means of fixing points to the carrier at mutually spaced apart, opposing carrier pieces.

The scope of the present invention also includes a method for assembling a strain gauge arrangement according to the invention, as described above, which is characterized by the following steps:

a) at least the part of the carrier is elastically braced by means of a bracing element;
b) at least the part of the carrier is kept in the elastically braced state by means of the bracing element and the carrier is fastened, in particular adhesively bonded, to the structure to be monitored;
c) the bracing element is removed. This method is particularly simple and can also, in particular, be used well in an inhospitable environment (e.g. on rails of railroad lines in open countryside). The fastening according to step b) is only complete once the fastening has reached a desired strength (for example after an adhesive has cured). The strain gauge arrangement is operated, i.e., the strain of the structure to be monitored is monitored, only after step c). During operation, there is also monitoring as to whether the deformation of the carrier still exists or has been lost as a result of detachment from the structure.

An advantageous variant of the method according to the invention provides for the bracing element to be securely connected to the carrier before step a) and for the bracing element to be broken off from the carrier for step a). The bracing element formed on, or fastened to, the carrier is always available for assembly, and can simply be broken off and used immediately for the bracing process. In particular, the bracing element can in particular be embodied as a cam.

Likewise, a variant that provides for the bracing element to be securely connected to the carrier in steps a) and b) and for the bracing element to be broken off from the carrier for step c) is advantageous. Here, too, the bracing element, which is initially fastened to, or formed on, the carrier, is always available. Before being broken off, the bracing element puts or keeps the rest of the carrier under pretension, which is used for the installation. Following the completion of the fastening of the carrier to the structure, the bracing element is broken off so that the pretension is only kept via the fastening (for example, adhesive bonding or screwing) on the structure, and so the pretension or associated elastic deformation is lost in the case of a fall-off from the structure.

A development of these variants in which, following the assembly of one or more strain gauge arrangements, the bracing elements which were broken off and removed in step c) are checked for completeness is advantageous. This facilitates a simple prima facie check as to whether the strain gauge arrangements have been correctly installed.

Further advantages of the invention are apparent from the description and the drawing. Likewise, the aforementioned features and the features yet to be explained below can, according to the invention, each find use individually or together in any combination. The embodiments shown and described should not be understood to be an exhaustive list, but rather have an exemplary character for the purpose of illustrating the invention.

BRIEF DESCRIPTION OF THE DRAWINGS

The invention is illustrated in the drawing and explained in more detail on the basis of exemplary embodiments. In the figures:

FIG. 1b shows a schematic cross-sectional view of the strain gauge arrangement of FIG. 1a;

DETAILED DESCRIPTION OF THE PREFERRED EMBODIMENTS

Figure 1A:
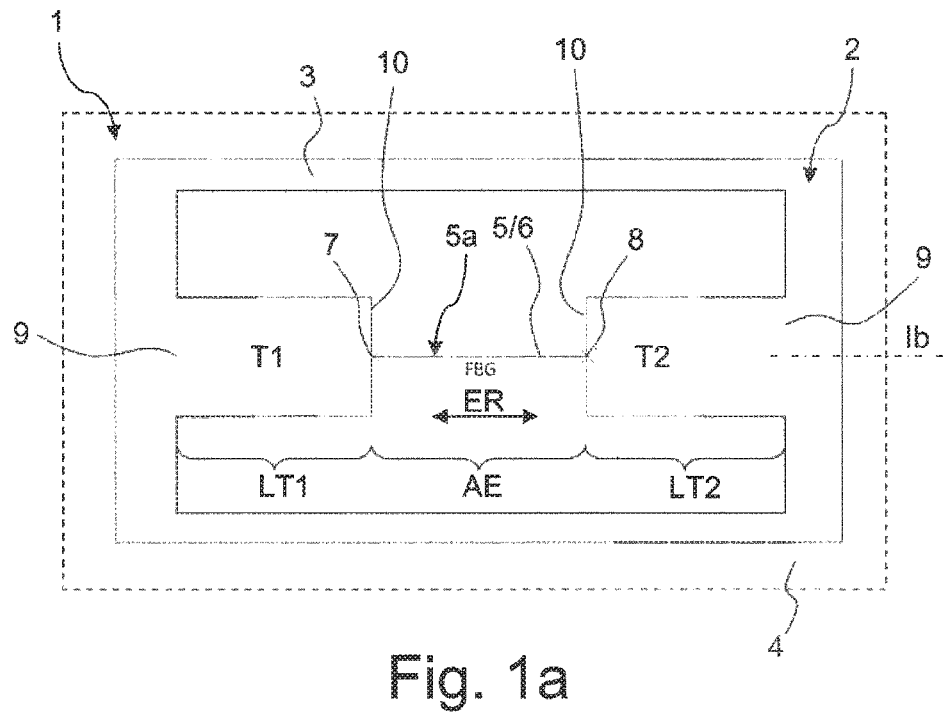
FIG. 1a shows a schematic plan view of a first embodiment of a strain gauge arrangement according to the invention, with a frame-shaped base element.
Figure 1B:
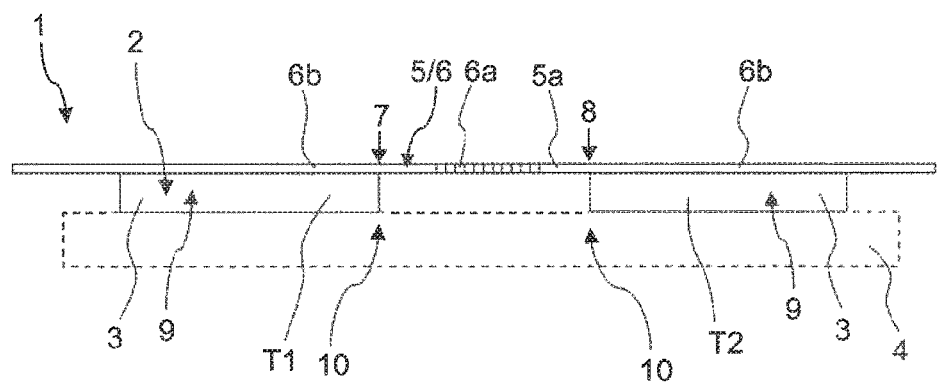

FIG. 1a shows a first embodiment of a strain gauge arrangement 1 according to the invention in a plan view, and FIG. 1b shows an associated cross-sectional view, cf. plane Ib in FIG. 1a.

The strain gauge arrangement 1 comprises a carrier 2, which here comprises a substantially rectangular base element 3 that is closed in ring-shaped fashion, a first carrier piece T1, and a second carrier piece T2. The carrier pieces T1, T2 protrude inward from the base element 3, which forms an outer frame of the carrier 2.

By way of the frame-shaped base element 3, the carrier 2 is fastened to a structure 4 to be monitored in a manner not shown in detail, e.g., it adhesively bonds to the structure 4 with the entire underside of the base element 3; however, the undersides of the carrier pieces T1, T2 are not adhesively bonded to the structure 4, but only rest on said structure 4. By way of example, the structure 4 to be monitored can be a railroad track of a train route.

A strain sensor element 5 is fastened to the carrier pieces T1 and T2 at fixing points 7, 8. The fixing points 7, 8 each lie at the inner end of the pieces T1, T2. The central section 5a of the strain sensor element 5 located between the fixing points 7, 8 freely spans between the pieces T1, T2 in this case.

In the embodiment shown, the strain sensor element 5 is embodied as an optical fiber 6 with a fiber Bragg grating (FBG) 6a in the central section 5a. It should be noted that the fiber 6 is only shown in the region of the central section 5a in FIG. 1a for simplification purposes; FIG. 1b also shows feed lines 6b of the fiber 6. Alternatively, other types of strain sensor elements, such as electrical resistance-measuring strips, could also be used.

In a basic state for using the strain sensor element 5 for monitoring the strain of the structure 4, the strain sensor element 5 is typically slightly elastically strained in the direction of extension ER of the fiber 6 in the central section 5a in order to set the working point of the FBG. Here, the elastic strain of the strain sensor element 5 can be predetermined practically as desired when or by fastening the strain sensor element 5 to the fixing points 7, 8 (in the basic state).

If there is a deformation of the structure 4, the base element 3 fastened to the structure 4 is also deformed. This deformation of the base element 3 is transferred to the strain sensor element 5 via the carrier pieces T1, T2, as a result of which this deformation becomes measurable.

A total length GL of the pieces T1, T2, in each case from the rear region 9 to the front region 10 where the respective fixing point 7, 8 is arranged, with GL=LT1+LT2, is significantly longer than the distance AE between the fixing points 7, 8 in this case. In the embodiment shown, GL=2*AE applies approximately; in general, GL≥2*AE or GL≥3*AE is preferred. As a result of the pieces T1, T2 protruding parallel to the direction of extension ER of the strain sensor element 5, which pieces move when the structure 4 is deformed along the direction of extent ER but are themselves hardly deformed, the deformation of the structure 4 or the frame in the direction of extent ER can be transferred in reinforced fashion to the strain sensor element 5, in accordance with the ratio AE/(LT1+AE+LT2).

In the basic state already mentioned, the frame-shaped base element 3 is in an elastically deformed state, in which it is kept by the underlying structure 4 to which the base element 3 is fastened. In the present case, the base element 3 is strained slightly elastically with respect to the direction of extent ER. Should the base element 3 or the carrier 2 fall off the structure 4, the elastic deformation of the base element 3 would spring back; i.e., the base element 3 would contract in the direction of extent ER in this case. This would also change the elastic strain state of the strain sensor element 5, as a result of which the fall-off from the structure 4 can be uncovered.

In the further described embodiments of strain gauge arrangements, it is primarily the differences from the embodiment of FIGS. 1a, 1b that are explained.

Figure 2A:
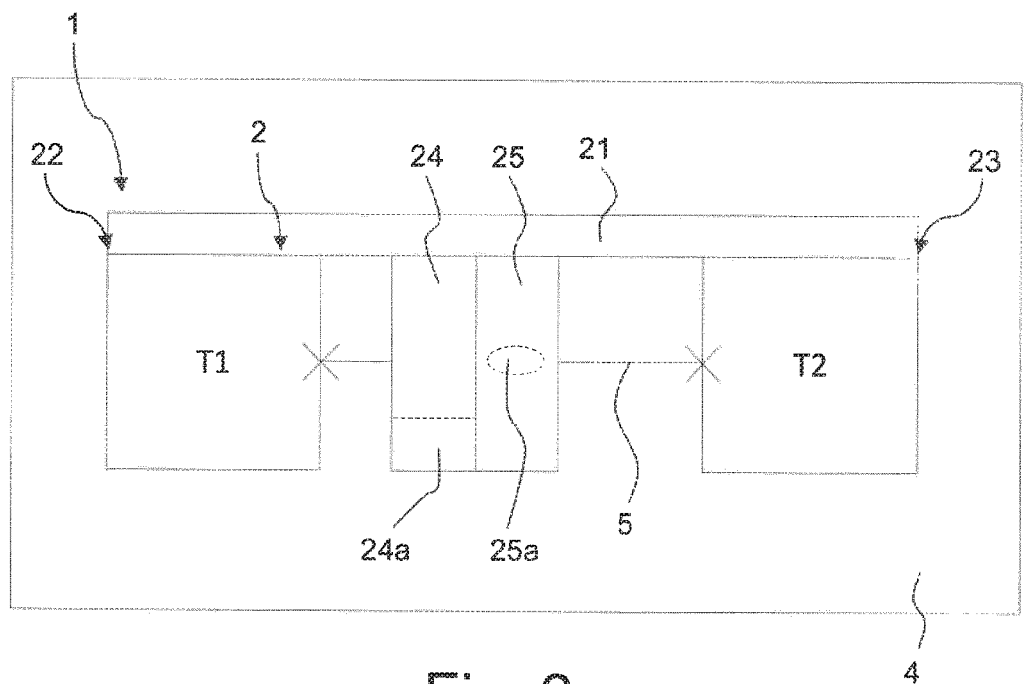
FIG. 2a shows a schematic plan view of a second embodiment of a strain gauge arrangement according to the invention, comprising a leaf spring element, support element and driver element.
Figure 2B:
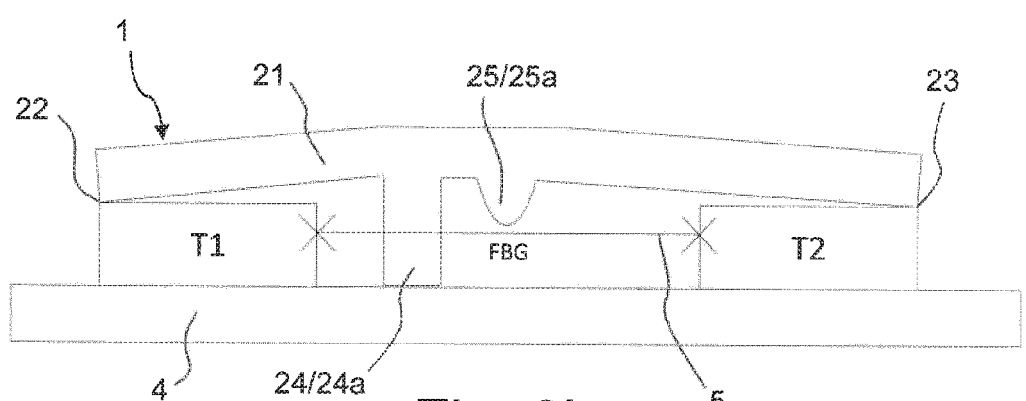
FIG. 2b shows a schematic side view of the strain gauge arrangement of FIG. 2a, comprising a carrier fastened to the structure.
Figure 2C:
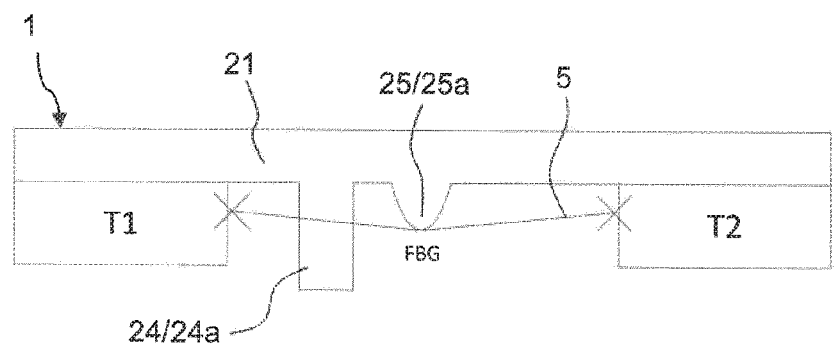
FIG. 2c shows a schematic side view of the strain gauge arrangement of FIG. 2a, comprising a carrier detached from the structure.

A second embodiment of a strain gauge arrangement 1 according to the invention is illustrated in a plan view in FIG. 2a and, in a side view, in the state fastened to the structure 4 in FIG. 2b and in the detached state in FIG. 2c.

The strain gauge arrangement 1 has a carrier 2, which also comprises a leaf spring element 21 in addition to the pieces T1, T2. In the embodiment shown, the leaf spring element 21 connects the two carrier pieces T1, T2 to one another, the leaf spring element 21 being fastened with its ends 22, 23 to the pieces T1, T2 in each case; the end regions of the leaf spring element 21 extending over the pieces T1, T2.

A support element 24 is formed on the leaf spring element 21, said support element extending over the strain sensor element 5 in this case and being supported with a support projection 24a on the structure 4 to be monitored as a stop partner. When the carrier 2 is fastened to the structure 4 (cf. FIG. 2b), the support element 24 presses the leaf spring element 21 away from the structure 4 in the upward direction, as a result of which the leaf spring element 21 is elastically deformed, specifically strained in this case.

Moreover, a driver element 25 is formed on the leaf spring element 21, said driver element likewise extending over the strain sensor element 5 in this case and having a driver projection 25a which projects downward in the direction towards the strain sensor element 5 in this case. Thus, driver projection 25a engages behind the strain sensor element 5 from above. In state where the leaf spring element 21 is elastically deformed by the support on the structure 4 (cf. FIG. 2b), the driver element 25 (or its driver projection 25a) is raised so far in the embodiment shown that it does not touch the strain sensor element 5. Accordingly, the strain sensor element 5 has its normal strain state, which is provided for normal measurement operation (for strain monitoring of the structure 4).

Should the strain gauge arrangement 1 fall off the structure 4, the leaf spring element 21 springs back into an elastically non-deformed state, which is shown in FIG. 2c, since the support element 24 no longer has a stop partner at the front end. In this state, the driver projection 25a of the driver element 25 presses on the strain sensor element 5 and impresses a significant elastic strain thereon. This significant elastic strain is easy to measure, as a result of which the strain gauge arrangement 1 falling from the structure 4 can easily be detected.

In the embodiment of FIGS. 2a-2c, the carrier pieces T1, T2 or the carrier 2 can be fastened to the structure 4 to be monitored without any significant shear stress, which simplifies the assembly.

Figure 3:
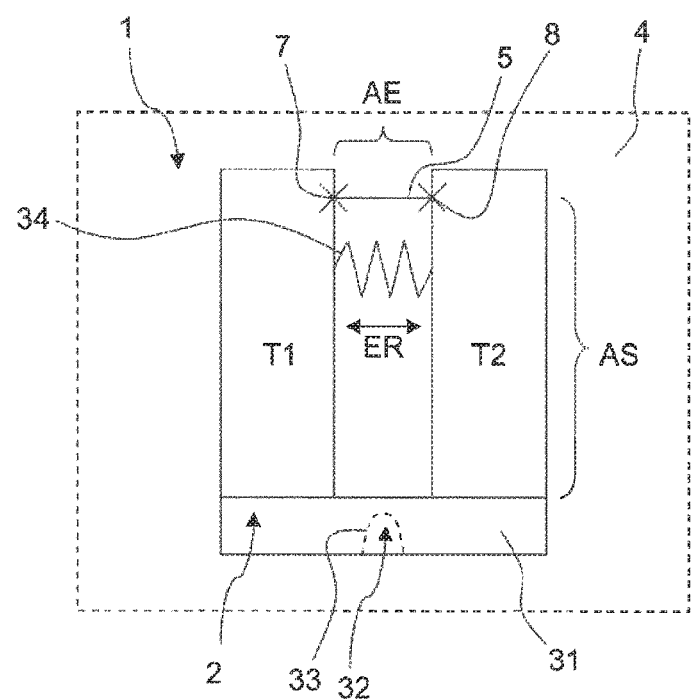
FIG. 3 shows a schematic plan view of a third embodiment of a strain gauge arrangement according to the invention, with a bracket.

FIG. 3 shows a third embodiment of a strain gauge arrangement 1 according to the invention in a schematic top view.

In this case, the carrier 2 comprises the pieces T1, T2, to which the strain sensor element 5 is fastened at the fixing points 7, 8, and a bracket 31, which connects the pieces T1, T2 to one another at one end (the lower end in FIG. 3). The direction of extent ER of the strain sensor element ER extends parallel to the bracket 31 or its connecting direction.

The carrier 2 is fastened to the structure 4 in an elastically deformed state, specifically with a certain mutual torsion of the pieces T1, T2, approximately around a joint region 32 in the middle of the bracket 31. The torsion acts approximately parallel to the direction of extension ER of the strain sensor element 5 in the region of the strain sensor element 5.

Should the structure 4 fall off, this torsion springs back, as a result of which the strain state at the strain sensor element 5 changes. Both the pieces T1, T2 and the bracket 31 are involved in the torsion.

The distance AS between the bracket 31 (or the upper part thereof) and the strain sensor element 5 is preferably significantly greater than the distance AE between the fixing points 7, 8 in order to be able to control the forces in the region of the strain sensor element 5 well. In the embodiment shown, approximately AS=3*AE applies; generally AS≥2*AE or AS≥3*A is preferably chosen.

If desired, the bracket 31 can be weakened in the joint region 32, for example by way of a notch 33. As a result, larger torsions can be produced with the same force, for example, which makes it easier to detect a fall-off from the structure. It is likewise possible to dispose a spring 34 or a plurality of springs 34 (tension or compression springs, as required) between the pieces T1, T2 in order to adjust the elastic behavior of the pieces T1, T2 with respect to one another.

It should be noted that in this embodiment, too, the strain sensor element 5 can be freely spanned in the central section 5a, and an elastic strain state of the strain sensor element 5 in the basic state can, in principle, be freely determined.

Figure 4A:
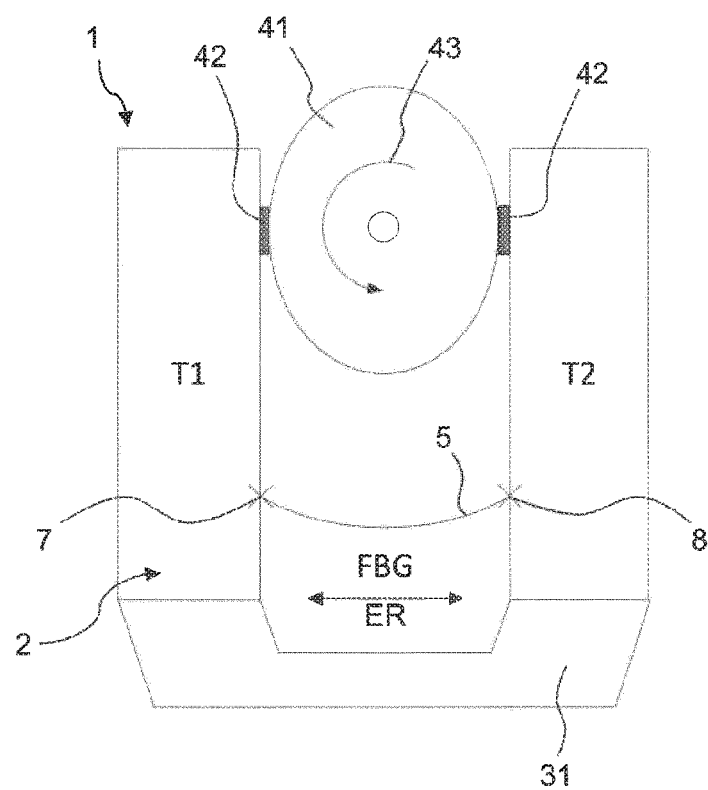
FIG. 4a shows a schematic plan view of a fourth embodiment of a strain gauge arrangement according to the invention, comprising a cam that has not yet been broken out.

FIG. 4a shows a fourth embodiment of a strain gauge arrangement 1 according to the invention. In this case, the carrier 2 comprises the carrier pieces T1, T2, to which the strain sensor element 5 is fastened with the fixing points 7, 8, and a bracket 31, which connects the carrier pieces T1, T2. Prior to the assembly of the strain gauge arrangement 1, a bracing element 41, which is designed as a cam, is kept between the carrier pieces T1, T2. The bracing element 41 is typically made in one piece with the remainder of the carrier 2 (for example by laser cutting from a metal sheet) and is held at the remainder of the support 2 at two predetermined breaking points 42, between the carrier pieces T1, T2 in this case. In the situation shown in FIG. 4a, the carrier 2 is in an elastically relaxed state and has not yet been fastened to a structure. The long side of the bracing element 41 is aligned parallel to the carrier pieces T1, T2 or perpendicular to the direction of extension ER of the strain sensor element 5. The strain sensor element 5 hangs slack between the carrier pieces T1, T2; this state can easily be determined by a strain measurement.

For the assembly on a structure 4 to be monitored, the bracing element 41 is broken off from the predetermined breaking points 42, for example by turning 43 the bracing element 41 as shown in FIG. 4a.

Figure 4B:
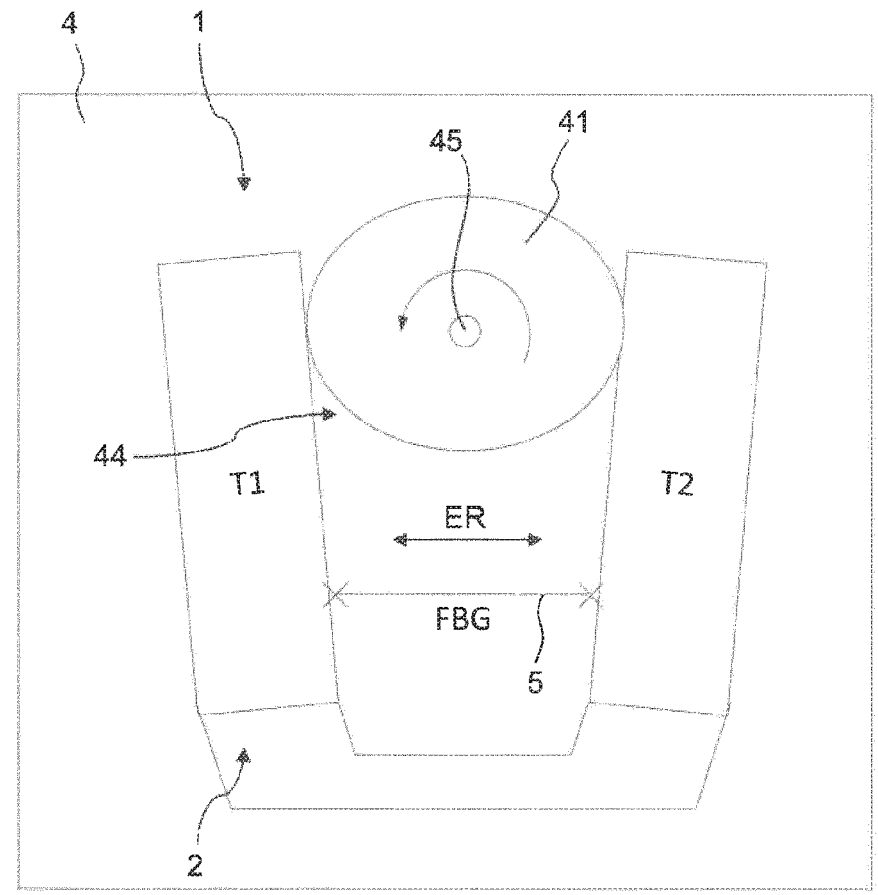
FIG. 4b shows the strain gauge arrangement of FIG. 4a, with a spreading cam.

As a result of half a rotation of the bracing element 41 or cam, the latter spreads the pieces T1, T2 apart (or applies torsion with respect to the carrier pieces T1, T2), as a result of which the carrier 2 assumes an elastically deformed state, cf. FIG. 4b. A bracing bearing 44 for the bracing element 41 is consequently set up between the inner sides of the carrier pieces T1, T2; a fixed axis of rotation 45 is typically set up for the bracing element 41. The strain sensor element 5 is tightened and receives a slight elastic strain, in accordance with the working point thereof. The long side of the bracing element 41 is aligned perpendicular to the carrier pieces T1, T2 or parallel to the direction of extension ER of the strain sensor element 5. In this spread state, the carrier 2 is fastened, for example adhesively bonded, to the structure 4 to be monitored.

Figure 4C:
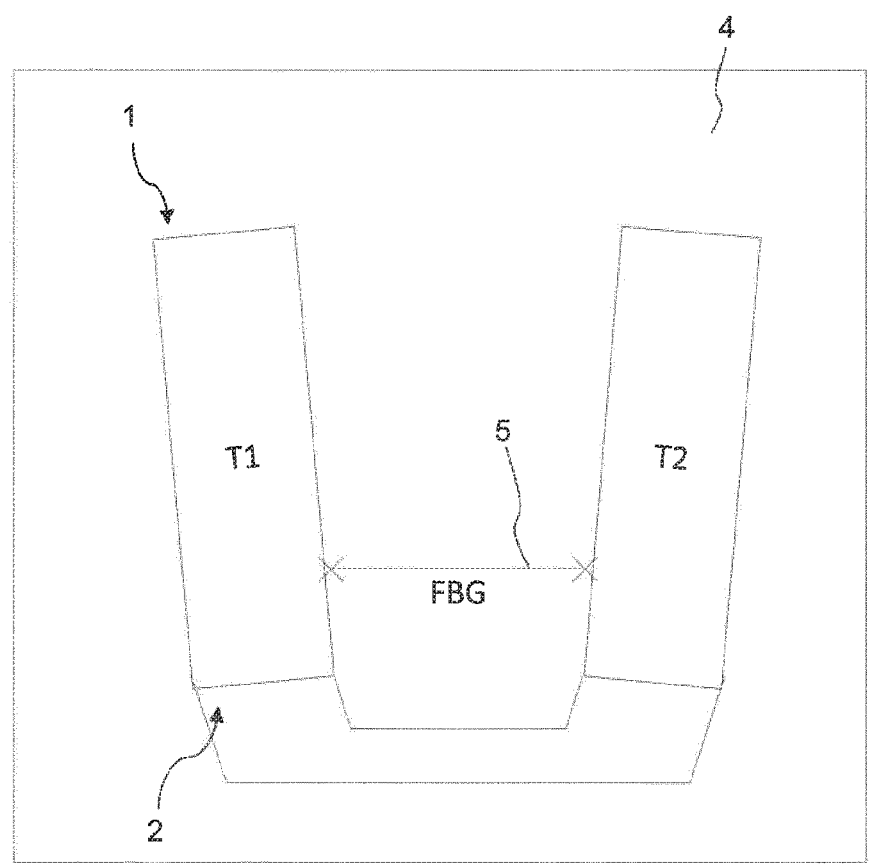
FIG. 4c shows the strain gauge arrangement of FIG. 4b, following fastening to the structure and with the cam removed.

After fastening to the structure 4 (for example after an adhesive has cured), the bracing element can be removed, cf. FIG. 4c. For as long as the strain gauge arrangement 1 remains fastened to the structure 4, the elastically deformed state of the carrier 2 and the slight elastic strain of the strain sensor element 5 are also retained. Should detachment from the structure 4 occur, the strain gauge arrangement 1 would return to the elastically relaxed state shown in FIG. 4a, which could easily be measured by the slackening of the strain sensor 5.

Figure 5A:
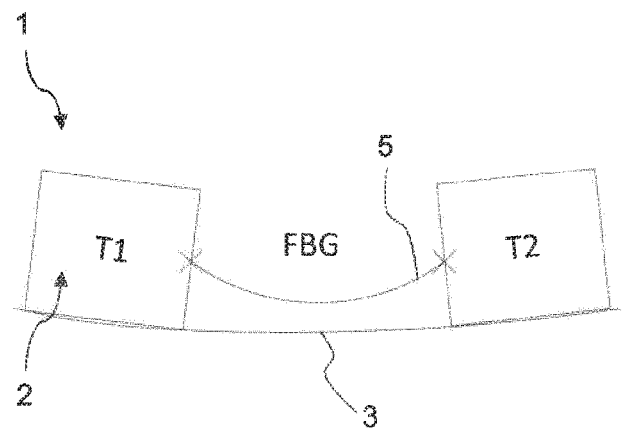
FIG. 5a shows a schematic side view of a fifth embodiment of a strain gauge arrangement according to the invention, comprising a base element in the elastically relaxed, arched state.

In the fifth embodiment of a strain gauge arrangement 1 according to the invention, shown schematically in a side view in FIG. 5a, the carrier 2 has a base element 3, with a closed area in this case, to which the pieces T1, T2 are fastened. In the shown elastically relaxed state of the base element 3, in which it is not fastened to a structure 4, the base element 3 is arched, as a result of which the pieces T1, T2 are close together and a strain sensor element 5 extending therebetween is slack, which is easy to measure.

Figure 5B:
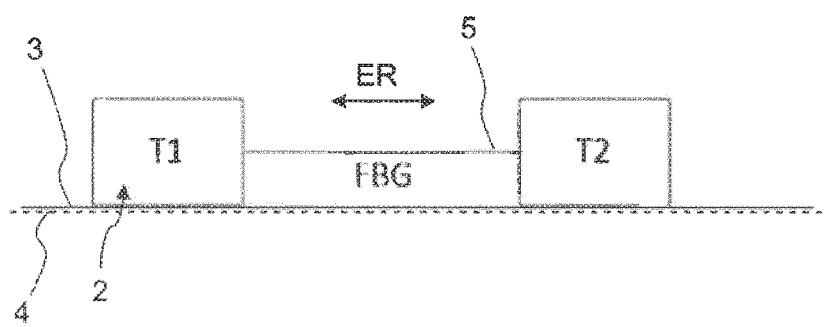
FIG. 5b shows the strain gauge arrangement of FIG. 5a, in the elastically deformed, flat state of the base element.

In the basic state shown in FIG. 5b, in which the carrier 2 is fastened, for instance adhesively bonded, to the structure 4 to be monitored (shown in dashed lines) by means of the base element 3, the base element 3 is kept in an elastically deformed state, a flat state in this case, and the strain sensor element 5 is tightened so that it can be used in its working range. In particular, deformations of the structure 4 along (or with a component along) the direction of extension ER of the strain sensor element 5 can be measured well.

Figure 6A:
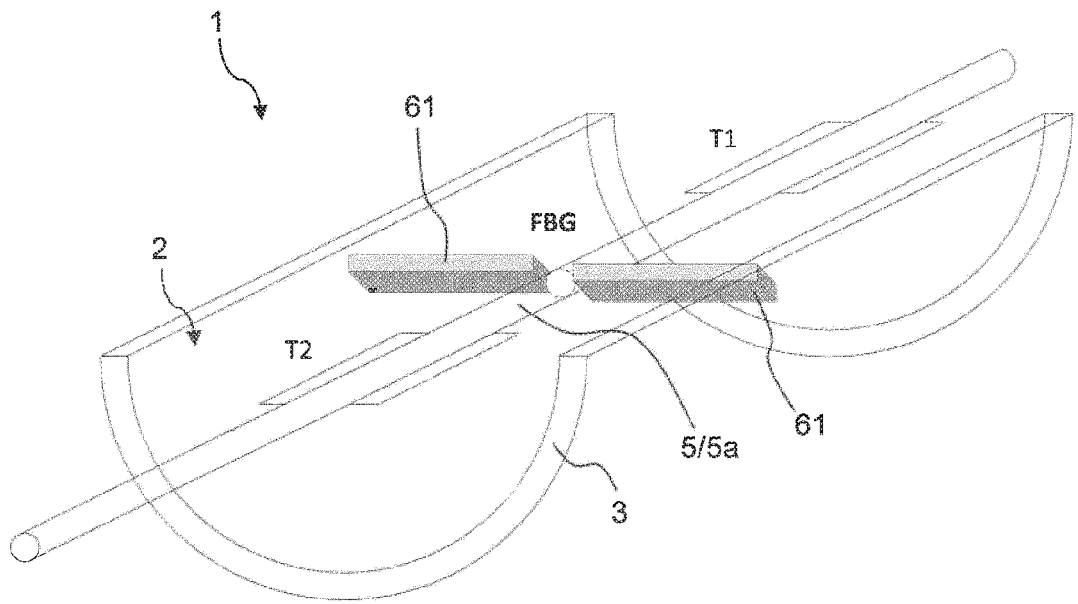
FIG. 6a shows a schematic embodiment of a sixth embodiment of a strain gauge arrangement according to the invention, comprising application elements in contact with the strain sensor element.
Figure 6B:
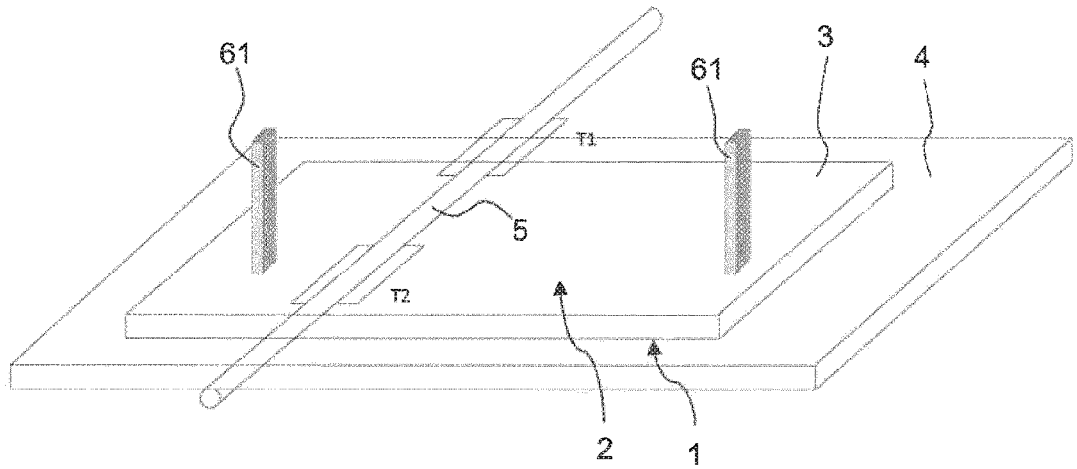
FIG. 6b shows the strain gauge arrangement of FIG. 6b, with the application elements disposed away from the strain sensor element.

A sixth embodiment of a strain gauge arrangement 1 according to the invention is illustrated in an elastically relaxed state of a base element 3 of a carrier 2 in FIG. 6a and in an elastically deformed state of said base element 3 in FIG. 6b. Two application elements 61 are arranged or formed on the base element 3.

In an elastically relaxed state of the base element 3, the latter assumes an arched state, as a result of which the application elements 61 press on the strain sensor element 5 in a central region 5a between the carrier pieces T1, T2 (the fastening of which to the rest of the carrier 2 has not been shown in detail for the sake of simplification), as illustrated in FIG. 6a, or even cut therethrough (not shown in detail). As a result, the strain sensor element 5 is temporarily or permanently impaired in an easily measurable manner. If the strain sensor element 5 is embodied as an optical fiber with a fiber Bragg grating, the reflection wavelength can be greatly detuned, for example by squeezing the fiber, or the attenuation of the fiber can be greatly increased.

In an elastically deformed state of the base body 3, in this case, as shown in FIG. 6b, in a flat state of the base body 3 fastened to the flat structure 4 to be monitored, the application elements 61 are disposed distant from the strain sensor element 5 and do not impair the latter. Normal strain monitoring of the structure 4 can be carried out.

Figure 7:
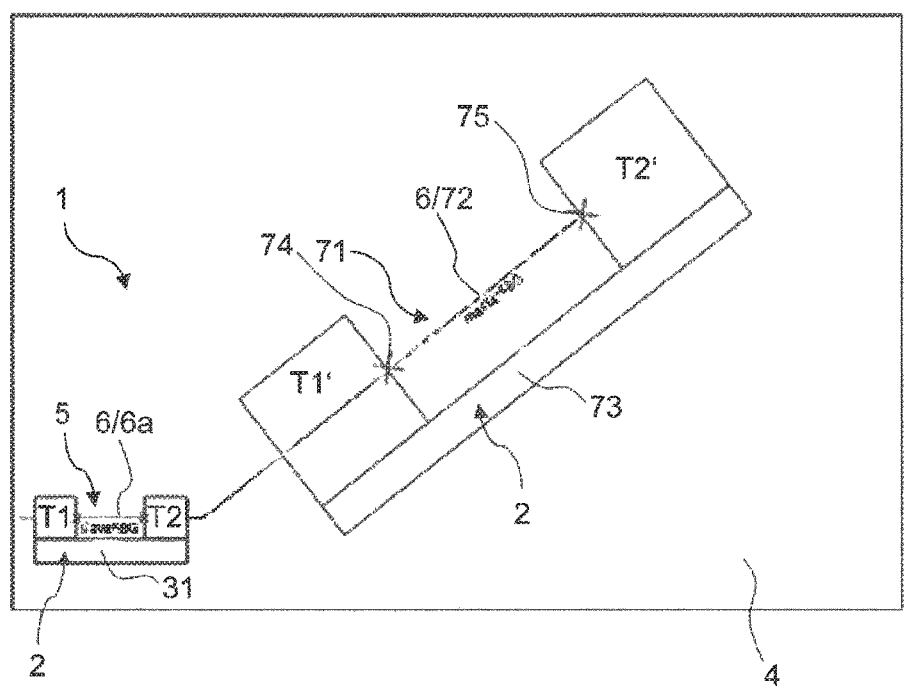
FIG. 7 shows a schematic embodiment of a seventh embodiment of a strain gauge arrangement according to the invention, comprising a fiber Bragg grating of the strain sensor element and a further fiber Bragg grating in a further strain sensor element.

FIG. 7 shows a seventh embodiment of a strain gauge arrangement 1 according to the invention. This includes a strain sensor element 5 and a further strain sensor element 71 in this case. The strain sensor element 5 is formed with a fiber Bragg grating 6a (also called a slave FBG or auxiliary FBG) (cf., e.g., FIG. 1a above in this respect), and the further strain sensor element 71 is formed with a further fiber Bragg grating 72 (also called master FBG or main FBG). The fiber Bragg grating 6a and the further fiber Bragg grating 72 are formed at different positions in the same optical fiber 6.

In the case of the strain sensor element 5, the two carrier pieces T1, T2 are fastened via the bracket 31 to the structure 4 in an elastically deformed state in relation to the structure 4 to be monitored (cf., e.g., FIG. 3 above); to this end, an elastic tension was typically applied locally to the carrier 2 during fastening, for instance using a cam or another bracing element (not illustrated in more detail). Should the elastic deformation of the carrier 2 be lost in the monitored region of the strain sensor element 5, this would be recognized by a significant change in the strain state on the strain sensor element 5.

At the further strain sensor element 71, the optical fiber 6 is fastened to carrier pieces T1', T2' with fixing points 74, 75 in this case, with the optical fiber 6 freely spanning between the fixing points 74, 75. The carrier pieces T1', T2' are also in this case interconnected by way of a bracket 73, but there is no local elastic bracing or deformation of the carrier 2 with respect to the structure 4. Thus, in the monitored region of the further strain sensor element 71, the carrier 2 transfers a deformation of the structure 4 without a tension offset by the local carrier 2.

In the embodiment shown, the fiber Bragg grating 6a and the further fiber Bragg grating 72 have significantly different, non-overlapping reflection wavelength intervals. By way of example, the reflection wavelength of the fiber Bragg grating 6a (primarily depending on the deformation state of the local carrier 2) can be in the range of 720 nm to 670 nm, and the further reflection wavelength of the further fiber Bragg grating 72 (primarily depending on the strain state of the structure 4) can be in the range of 635 nm to 625 nm. Then, the correct fit on the structure 4 can be checked on the basis of the current reflection wavelength of the strain sensor element 5, and the deformation of the structure 4 can be checked on the basis of the current, further reflection wavelength of the further strain sensor element 71; both are measurable at the same time. Alternatively, the strain sensor element 5 or the strain gauge arrangement 1 could be set up in such a way that, in the event of falling off, the fiber Bragg grating 6a becomes non-transparent in the working range (corresponding to the entire further reflection wavelength interval) of the further fiber Bragg grating 72, which can easily be uncovered when an attempt is made to determine the reflection wavelength of the further fiber Bragg grating 72.

Typically, the local parts of the carrier 2 are fastened in the same way in the monitored region of the strain sensor element 5 and in the monitored region of the further strain sensor element 71, and so an equal hold (for example as a result of aging) can generally be expected. Preferably, all parts of the carrier 2 are mechanically coupled to one another, in a manner not shown in detail, so that all parts of the carrier 2 behave in the same way (in particular all are fastened to the structure 4 or all fall-off therefrom).

Figure 8A:
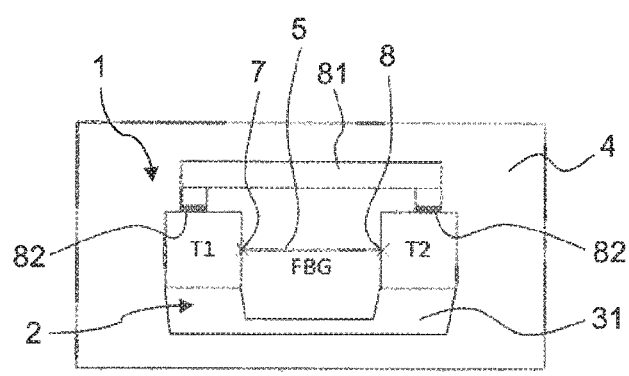
FIG. 8a shows a schematic embodiment of an eighth embodiment of a strain gauge arrangement according to the invention, comprising a bracket and securely connected bow-shaped bracing element, during fastening to a structure.

FIG. 8a shows an eighth embodiment of a strain gauge arrangement 1 according to the invention. The carrier 2 comprises the pieces T1, T2, to which the strain sensor element 5 is fastened at the fixing points 7, 8. Firstly, the pieces T1, T2 are securely connected to one another via a bracket 31 of the carrier 2, and, secondly, also securely connected to one another via a bow-shaped bracing element 81 in this case.

The bracing element 81 forces an elastic deformation in the bracket 31, with the pieces T1, T2 being spread apart from one another in this case (or being twisted against one another, cf. the description of FIG. 3 above in the respect as well). In this state, the carrier 2 (with the pieces T1, T2 and the bracket 31 but not with the bracing element 81) is fastened, for example adhesively bonded, to a structure 4 to be monitored.

Figure 8B:
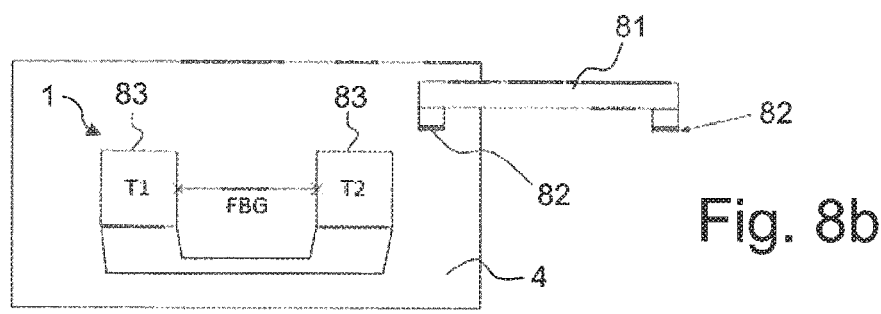
FIG. 8b shows the strain gauge arrangement of FIG. 8a, following fastening to the structure, with a broken off bracing element.

After complete fastening, the bracing element 81 is removed; to this end, the bracing element 81 is broken off the carrier 2 at predetermined breaking points 82, cf. FIG. 8b. The elastically spread state of the bracket 31 is maintained by the structure 4 to which the carrier 2 is fastened. The regions of the fracture surfaces remaining on the carrier pieces T1, T2 can be considered to be a bracing bearing 83 for the bracing element 81.

Figure 8C:
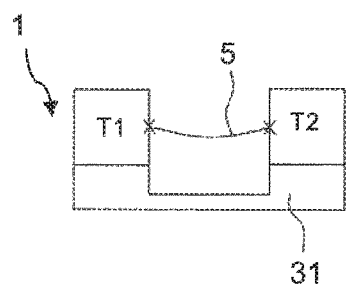
FIG. 8c shows the strain gauge arrangement of FIG. 8b, following a fall from the structure.

Should the strain gauge arrangement 1 fall off the structure 4, the bracket 31 subsequently assumes an elastically relaxed state. This is shown in FIG. 8c. As a result, the pieces T1, T2 approach each other and the strain sensor element 5 slackens. This is easy to measure on the strain sensor element.

Figure 9:
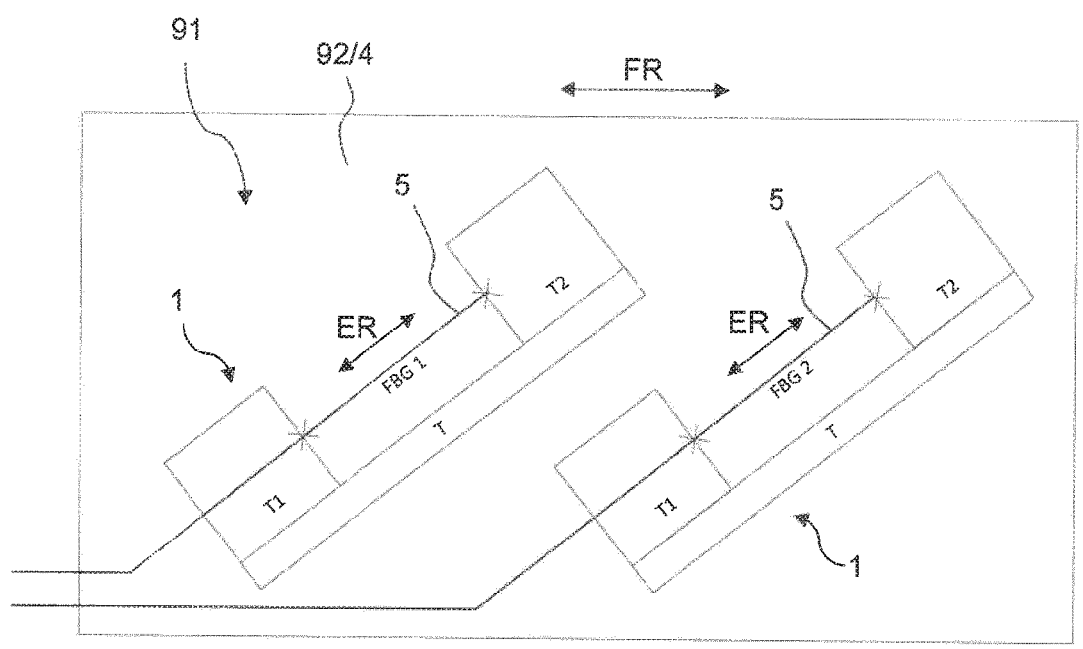
FIG. 9 shows a schematic view of an axle counter, comprising two strain gauge arrangements according to the invention.

FIG. 9 illustrates in a schematic side view an axle counter 91 for the invention, which is fastened laterally to a railroad rail 92 (for instance to the so-called rail web) as structure 4 to be monitored. The axle counter 91 in this case comprises two strain gauge arrangements 1 according to the invention, each of which is formed in exemplary fashion in this case with two pieces T1, T2 and a bracket 31 connecting them (cf., e.g., FIG. 3). Trains whose train axles can be detected by the axle counter 91 can travel on the rail 92 in the direction of travel FR. The directions of extension ER of the strain sensor elements 5 run obliquely to the direction of travel FR, at an angle of approximately 45° in the embodiment shown. It should be noted that the direction of travel FR corresponds at the same time to the direction of a neutral fiber in the rail 92 or structure 4 under the load of the trains.

If, for example, a train axle rolls from left to right in FIG. 9 above the axle counter 91, the left strain gauge arrangement 1 first registers a relative strain and then a relative compression in relation to a basic state (without a train crossing). Somewhat later, the right strain gauge arrangement 1 also registers a relative strain first, and then a relative compression in relation to the basic state. In the case of an opposite direction of travel, the sequence of events is reversed accordingly.

A redundancy can be set up as a result of the two strain gauge arrangements 1 in the axle counter 91, improving safety in train operation. It should be noted that, in simpler embodiments, only one strain measuring arrangement may be provided in the axle counter 91.

LIST OF REFERENCE SIGNS

1 Strain gauge arrangement
2 Carrier
3 Base element
4 Structure to be monitored
5 Strain sensor element
5a Central section
6 Optical fiber
6a Fiber Bragg grating
6b Feed line
7 First fixing point
8 Second fixing point
9 Rear region
10 Front region 21 Leaf spring element
22 End (leaf spring element)
23 End (leaf spring element)
24 Support element
24a Support projection
Driver element
25a Driver projection
31 Bracket
32 Joint region
33 Notch
34 Spring
41 Bracing element (cam)
42 Predetermined breaking point
43 Direction of rotation
44 Bracing bearing
45 Fixed axis of rotation
61 Application element
71 Further strain sensor element
72 Further fiber Bragg grating
73 Further bracket
74 Fixing point
75 Fixing point
81 Bracing element (bow-shaped)
82 Predetermined breaking point
83 Bracing bearing (for bow-shaped bracing element)
91 Axle counter
92 Railroad track
AE Fixing point spacing
ER Direction of extension (strain sensor element)
GL Total length of pieces T1, T2
FBG Fiber Bragg grating
FR Direction of travel
LT1 Length of piece T1
LT2 Length of piece T2
T1 First piece (strain sensor element)
T1' First piece (further strain sensor element)
T2 Second piece (strain sensor element)
T2' Second piece (further strain sensor element)

What is claimed is:

1. A strain gauge arrangement for an axle counter, comprising:
at least one strain sensor element, being an optical fiber with a fiber Bragg grating;
a carrier to which the at least one strain sensor element is fastened; and
a structure to be monitored, the structure being a railroad track, to which the carrier is fastened;
wherein at least a part of the carrier is kept in an elastically deformed state by the structure when the carrier is fastened to the structure;
wherein the carrier is embodied with a first carrier piece and a second carrier piece, which oppose one another in spaced apart fashion;
wherein the at least one strain sensor element is fastened to the first carrier piece with at least one first fixing point, to the second carrier piece with at least one second fixing point, and to neither the first nor the second carrier piece with a central section between the fixing points;
wherein the part of the carrier which is kept in an elastically deformed state by the structure when the carrier is fastened to the structure comprises a leaf spring element,
wherein the following are formed on the leaf spring element:
a support element for support on the structure when the carrier is fastened to the structure, wherein, when the carrier is fastened to the structure, the support element pushes the leaf spring element upwardly away from the structure, as a result of which the leaf spring element is elastically deformed; and
a driver element for reaching behind the at least one strain sensor element in the central section, wherein, following a detachment of the carrier from the structure, the leaf spring element springs back into an elastically non-deformed state and the driver element presses against the at least one strain sensor element and impresses an elastic strain on the latter.

2. The strain gauge arrangement as claimed in claim 1, wherein when the carrier is fastened to the structure, the driver element is lifted so far that the latter does not contact the at least one strain sensor element.

3. The strain gauge arrangement as claimed in claim 2, wherein the leaf spring element and the driver element are embodied in such a way that no strain, or only little strain, is applied to the at least one strain sensor element by said leaf spring and driver elements in the elastically deformed state of the leaf spring element when the carrier is fastened to the structure, and a greater strain is applied to the at least one strain sensor element in an elastically relaxed state of the leaf spring element after the carrier has been detached from the structure.

4. The strain gauge arrangement as claimed in claim 2, wherein the driver element has a driver projection projecting downward on the at least one strain sensor element and in that, in the elastically non-deformed state of the leaf spring element, the driver element presses on the at least one strain sensor element by way of the driver projection.

5. The strain gauge arrangement as claimed in claim 1, wherein the leaf spring element and the driver element are embodied in such a way that no strain, or only little strain, is applied to the at least one strain sensor element by said leaf spring and driver elements in the elastically deformed state of the leaf spring element when the carrier is fastened to the structure, and a greater strain is applied to the at least one strain sensor element in an elastically relaxed state of the leaf spring element after the carrier has been detached from the structure.

6. The strain gauge arrangement as claimed in claim 5, wherein the driver element has a driver projection projecting downward on the at least one strain sensor element and in that, in the elastically non-deformed state of the leaf spring element, the driver element presses on the at least one strain sensor element by way of the driver projection.

7. The strain gauge arrangement as claimed in claim 1, wherein the driver element has a driver projection projecting downward on the at least one strain sensor element and in that, in the elastically non-deformed state of the leaf spring element, the driver element presses on the at least one strain sensor element by way of the driver projection.

* * * * *